US010436178B2

(12) United States Patent
Hales et al.

(10) Patent No.: US 10,436,178 B2
(45) Date of Patent: Oct. 8, 2019

(54) WIND TURBINE WITH OVER-RATING CONTROL

(71) Applicant: VESTAS WIND SYSTEMS A/S, Aarhus N (DK)

(72) Inventors: Kelvin Hales, Surrey (GB); Chris Spruce, Leatherhead (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 373 days.

(21) Appl. No.: 15/125,527

(22) PCT Filed: Mar. 12, 2014

(86) PCT No.: PCT/DK2014/050056
§ 371 (c)(1),
(2) Date: Sep. 12, 2016

(87) PCT Pub. No.: WO2015/135546
PCT Pub. Date: Sep. 17, 2015

(65) Prior Publication Data
US 2017/0096983 A1 Apr. 6, 2017

(51) Int. Cl.
F03D 7/02 (2006.01)
(52) U.S. Cl.
CPC ...... F03D 7/028 (2013.01); F05B 2270/1033 (2013.01); F05B 2270/1075 (2013.01); Y02E 10/723 (2013.01)
(58) Field of Classification Search
CPC ...... F03D 7/028; F03D 7/0284; F03D 7/0288; F03D 7/0292; F03D 7/04; H02P 2101/15;
(Continued)

(56) References Cited

U.S. PATENT DOCUMENTS

2006/0273595 A1 12/2006 Avagliano et al.
2007/0216166 A1* 9/2007 Schubert ............... F03D 7/0224
290/55
(Continued)

FOREIGN PATENT DOCUMENTS

CN 1873219 A 12/2006
CN 1894837 A 1/2007
(Continued)

OTHER PUBLICATIONS

International Search Report for PCT/DK2014/050056, dated Nov. 4, 2014.
(Continued)

Primary Examiner — Eldon T Brockman
(74) Attorney, Agent, or Firm — Patterson + Sheridan, LLP

(57) ABSTRACT

A method is disclosed for controlling a wind turbine generator to provide power above a rated level based upon operational constraints. The wind turbine includes an over-rating controller that calculates an over-rating power demand in response to the values of one or more operating parameters, and communicates this demand to the generator. An over-rating command value is calculated according to set points of the operating parameter(s), the calculation taking into account the extent to which the operating parameter differs from these set points. The over-rating command value may vary proportionately with the difference between the operating parameter and the associated set point. If multiple operating parameters are used then the over-rating power demand may correspond to the minimum over-rating command value. Furthermore, the power demand maybe communicated to wind turbine generators individually, or may be calculated for a wind turbine park.

15 Claims, 6 Drawing Sheets

(58) Field of Classification Search
CPC .............. H02J 3/386; F05B 2270/1033; F05B 2270/1075; Y02E 10/723
USPC .................................................... 415/13, 17
See application file for complete search history.

(56) References Cited

U.S. PATENT DOCUMENTS

2011/0301769 A1* 12/2011 Lovmand ................ F03D 7/028
          700/287
2012/0061963 A1    3/2012 Thisted
2012/0313593 A1* 12/2012 Knuppel ............... F03D 7/0284
          323/234

FOREIGN PATENT DOCUMENTS

| CN | 102257721 A | 11/2011 | |
|----|-------------|---------|--|
| CN | 103328818 A | 9/2013 | |
| EP | 1467463 A1 | 10/2004 | |
| GB | 2491548 A | 12/2012 | |
| WO | WO-2013000468 A1 * | 1/2013 | ........... F03D 7/0284 |

OTHER PUBLICATIONS

Chinese Office Action for Application No. 201480077944.7 dated May 25, 2018.

\* cited by examiner

WIND TURBINE WITH OVER-RATING CONTROL

This invention relates to over-rating control in wind turbines and wind power plants, and particularly to methods and apparatus which enable one or more wind turbines of a plant to transiently generate power at above the rated output depending upon external variables.

The rated power of a wind turbine is defined in IEC 61400 as the maximum continuous electrical power output which a wind turbine is designed to achieve under normal operating and external conditions. Large commercial wind turbines are generally designed for a lifetime of 20 years and their rated power output takes into account that lifespan.

Over-rating a wind turbine is desirable because it provides an increase in the annual energy production (AEP) of the turbine. In other words, more energy can be generated over a year than if the turbine were operated solely at its rated setting. However, over-rating leads to increased wear and component fatigue within the turbine, with the result that the lifespan of the turbine can be shortened. Over-rating can also mean that the turbine might need increased maintenance, possibly requiring the turbine to be shut down while an engineer is on site. Shutting a wind turbine down places a greater burden on the remaining turbines in the plant to meet the target power output of the plant at that time, and means that the expected increase in AEP is not realised. Maintenance can also be difficult and expensive as the turbines may be in inaccessible locations. It is therefore beneficial to control the extent to which each wind turbine is over-rated, balancing the need to meet power output demands with the drawbacks outlined above.

Further considerations may be important in deciding how much to over-rate each wind turbine. For example, known control systems measure the temperatures of particular electrical components in the turbine nacelle and place an upper limit on the amount of over-rated power to be generated. For safety's sake, such systems are designed to be conservative and so may limit the power production unnecessarily leading to a loss in generation.

We have therefore appreciated that it would be desirable to provide improved control enabling wind turbines to operate above rated power.

SUMMARY OF THE INVENTION

The invention is defined in the independent claims to which reference should now be made. Advantageous features are set out in the dependent claims.

The present invention relates to a control method for controlling a wind turbine generator to generate power above its rated value, wherein the extent to which an operating characteristic of the wind turbine is over-rated is based on one or more wind turbine operating variables. The method comprises receiving a first set point for a first operating variable, determining whether the first operating variable differs from the set point, and determining the extent to which the wind turbine generator is to be over-rated between a maximum and a minimum over-rated setting value. The extent to which the wind turbine generator is over-rated is based on the extent to which the first operating variable differs from the first set point. A first over-rating command value is outputted based on the determination, and the over-rating of the wind turbine generator is controlled based on the first over-rating command value. This method has the advantage that the over-rating may be continually adjusted in response to changes in the one or more operating variables, in order to prevent the operating variables differing by too great an extent from their set points. This allows the average power output of the wind turbine to increase whilst still maintaining the operating variables within appropriate limits.

Advantageously, the operating characteristic is one or more of the power generated by the wind turbine generator, the rotational speed of the wind turbine generator, the load torque of the wind turbine generator, and load current of the wind turbine generator. Thus the extent to which the power output, rotational speed, load torque and/or load current of the generator is over-rated is controlled according to the method of the present invention.

Advantageously, the control method further comprises receiving an alarm set point for the first operating variable at which an alarm signal is issued, setting the maximum wind turbine over-rating to be equal to the over-rated setting when the first operating variable is equal to the first set point, and incrementally reducing the wind turbine over-rating to the minimum over-rated setting based on the extent to which the first operating variable differs from the first set point. As the value of the operating variable tends towards the alarm set point, the minimum over-rated setting is reached before the alarm set point is reached. The probability of an operating variable reaching an alarm set point is therefore reduced, allowing the wind turbine to run for longer periods of time between shutdowns.

Advantageously, when the first operating variable is determined to be equal to the alarm set point, an alarm signal is issued resulting in one or more of: the wind turbine generator being shut-down, de-rating of the power below rated power, pitching of the wind turbine blades into a feathered position, application of mechanical or electrical braking, disconnection of the main circuit breaker, sending a warning message to a supervisory control and data acquisition system, logging the operating conditions at the time of the alarm. Therefore appropriate action to prevent unsafe or undesirable operation of the wind turbine is taken.

Advantageously, the control method further comprises receiving a second set point for a second operating variable, determining whether the second operating variable differs from the second set point, and determining the extent to which the wind turbine generator is to be over-rated between a maximum and a minimum over-rated setting value. The extent of the over-rating is based on the extent to which the second operating variable differs from the second set point, and a second over-rating command value based on the determination is outputted. The over-rating of the wind turbine generator is controlled based on the first and second over-rating command values. Therefore the values of multiple operating variables can be accounted for, and the operating variables may be used in determining over-rating command values associated with each operating variable.

Advantageously, the control method further comprises selecting the minimum value from among the first over-rating command value and the second over-rating command value, controlling the over-rating of the wind turbine generator according to the minimum of the first over-rating command value and the second over-rating command value, and disregarding command values higher than the minimum selected command value. The operating variable that has the most limiting effect on the over-rating may thereby be determined and the amount of over-rating controlled accordingly.

Advantageously, the control method further comprises receiving a third set point for a third operating variable, the third set point indicating a transition point between an operational region where over-rating is permitted and an operational region where over-rating is to be cancelled, determining into which operational region the third operating variable falls, and cancelling over-rating of the wind turbine generator based on the determination. Thus for certain operating variables the over-rating may be immediately cancelled when the variable reaches a certain value.

Advantageously, the method further comprises querying one or more sensors to determine values for the first, second or third operating variables, and determining whether the first, second or third set points are exceeded based on the determined values. The values of the operating variables may therefore be determined by measurements made by sensors.

Advantageously, the method further comprises inferring values for the first, second or third operating variables by one or more of: estimating the value, calculating the value, looking up the value in a table, assigning a fixed number to the operating variable, using a mathematical formula to determine the value, determining the value on the basis of data supplied to the wind turbine, obtaining the value from hardware or software separate to the wind turbine. Therefore the values of the operating variables need not necessarily originate from measurements of physical quantities but may be inferred by other means.

Advantageously, the extent of the over-rating is determined using one or more of proportional control, proportional-integral control, proportional-integral-derivative control. Improved control process characteristics may therefore be achieved.

The present invention also relates to a wind turbine controller configured to perform the above method.

The present invention also relates to a computer program which when executed on a wind turbine controller causes the wind turbine controller to perform the steps of the above method.

BRIEF DESCRIPTION OF THE DRAWINGS

Embodiments of the invention will now be described, by way of example only, and with reference to the accompanying drawings, in which.

DETAILED DESCRIPTION

Figure 1:
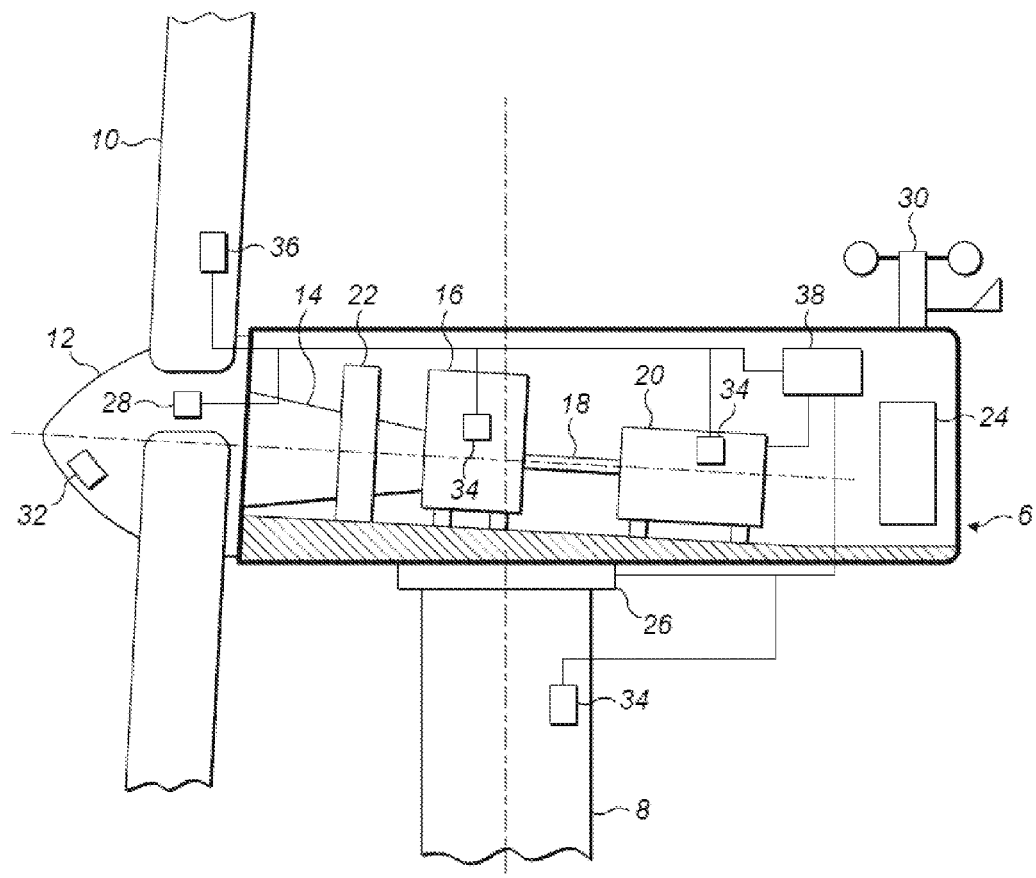
FIG. 1 is a schematic view of a wind turbine nacelle.

FIG. 1 is an illustration of an example wind turbine nacelle 6 mounted on a tower 8. One or more wind turbine blades 10 are connected to the hub 12, which rotates the main drive shaft 14. The drive shaft is coupled to a gearbox 16, which in turn drives a secondary shaft 18 coupled to the generator 20. The main drive shaft 14 is supported by the main bearing 22. A power convertor and/or transformer 24 is also housed within the nacelle. Further components include a yaw drive 26 and pitch actuator 28. Sensors 30, 32, 34, and 36 also feed sensor signals to a controller 38. These sensors may include an anemometer and wind vane 30, ranging wind speed measuring device 32 (for example, LIDAR, RADAR, or SONAR), temperature sensor(s) 34, and turbulence monitoring device 36. The temperature sensor(s) 34 measure(s) the temperature of the key components, for example the gearbox 16 and/or generator 20, as well as the air temperature both inside and outside the nacelle.

The controller 38 is responsible for controlling the components housed in the wind turbine nacelle 6, and the operation of the wind turbine generator. Controller 38 may therefore include one or more routines that variously adjust the pitch of the wind turbine blades, control the operation of the generator, and activate safety functions depending on the environmental and operational conditions sensed by the sensors. This description of control functions is not intended to be limiting. In this example, the controller 38 also operates as an over-rating controller that causes the generator to transiently produce power in excess of its rated value.

The control of a wind turbine to run at an over-rated power level relies on the values of the appropriate operating variables falling within established safe ranges. If the temperature of the gearbox becomes too high, for example, then it will no longer be possible to operate the wind turbine without potential damage occurring to the gearbox and its respective connected components. To avoid such situations, the over-rating controller 38 therefore receives sensor signals from the one or more sensors 30, 32, 34, 36, compares these with values stored in memory, and takes action to control the blade pitch angles and/or the generator as appropriate.

In a known control method, some of the values stored in memory correspond to upper acceptable limits on the variable being measured by the sensor. This kind of value, indicating a limit or threshold above which the value of the operating variable should not rise, shall be referred to in this example as an alarm limit. If the variable exceeds the alarm limit, then the controller may issue an alarm signal, which in turn may trigger a shut down of the wind turbine generator, a de-rating of the power, pitching of the wind turbine blades into a feathered position, or indeed any other suitable protection function.

Additionally, the controller stores one or more values in memory that correspond to an upper limit for the variable above which over-rating is considered to be unsafe or undesirable. This kind of value shall be referred to as an over-rating limit. Once the operating variable is detected as exceeding the over-rating limit, a cancellation function is applied to cut-off the over-rating applied by the over-rating controller. In other words, the value for the over-rating is cut from 100% directly to 0% and the over-rating is therefore deactivated.

The alarm limit and the over-rating limit values are referred to as "set points" to indicate that the values are programmable and may be input at installation or maintenance by a design or maintenance engineer. Usually the set point for the over-rating limit is set slightly lower than the alarm limit, so that there is a safety margin between the cancellation of the over-rating and the issuance of an alarm signal.

In one example therefore, the over-rating controller may receive an input from the gearbox temperature sensor, and store an alarm limit value indicating the upper acceptable limit on the gearbox temperature and a lower, over-rating limit value indicating the temperature at which the over-rating should be cancelled. This allows over-rating to be deactivated before too high a temperature is reached, with the aim of allowing the gearbox to cool. If such action is not taken, then the increasing temperature will eventually exceed the alarm limit, potentially triggering a shut down, and contributing to a reduction in the AEP of that turbine, as well as increased maintenance costs.

The scenario described above is illustrated in more detail in FIG. 2, in which the x-axis of the graph indicates the gearbox oil temperature being detected by the sensor, and the y-axis of the graph indicates the power reference output by the over-rating controller. On the basis of the power reference $P_{ref}$ the generator output is controlled. A value of $P_{ref}$ of 1.0 corresponds to the rated or nominal power that the generator is designed to produce. A value for $P_{ref}$ of 1.1 for example indicates an over-rating set point for which the controller requires the generator to produce 10% more power than the rated value.

In this example, the over-rating control includes two distinct regimes. Up to a temperature indicated by $T_{cut-off}$, over-rating is permitted and the controller outputs a power reference signal of 1.1, to set the power output by the generator to 10% over-rated. At temperature $T_{cut-off}$ the controller cancels the over-rating mode of operation, and the power output is set at 1.0, that is rated power. The higher temperature setting of $T_{alarm}$ indicates an upper safe limit on the gearbox oil temperature at which an alarm signal is transmitted to the controller and the turbine possibly shut down for safety reasons. $T_{alarm}$ will therefore be understood to be an alarm limit, and $T_{cut-off}$ an over-rating limit.

In this example, the gearbox oil temperature alarm limit may be set at 80° C., and the over-rating cut-off temperature set at 76° C. giving a 4° C. safety margin for over-rating to be cancelled, and the gearbox allowed to cool. It may be preferable in practice to use different thresholds depending on whether the operating variable is increasing or decreasing, as building hysteresis into the control acts to prevent rapid switching of the power reference when the operating variable is close to the threshold. Although, in this example, the cancellation of over-rating occurs as the variable increases beyond the over-rating limit, it will be appreciated that decreasing variables may also be used to cancel over-rating and trigger alarms.

The prior art over-rating controller described above has the disadvantage that repeated cycling between activated and deactivated over-rating leads quickly to component wear and fatigue, and has a further disadvantage in that the AEP is not as high as it could be for an over-rating controller employing a more sophisticated form of control.

Figure 3:
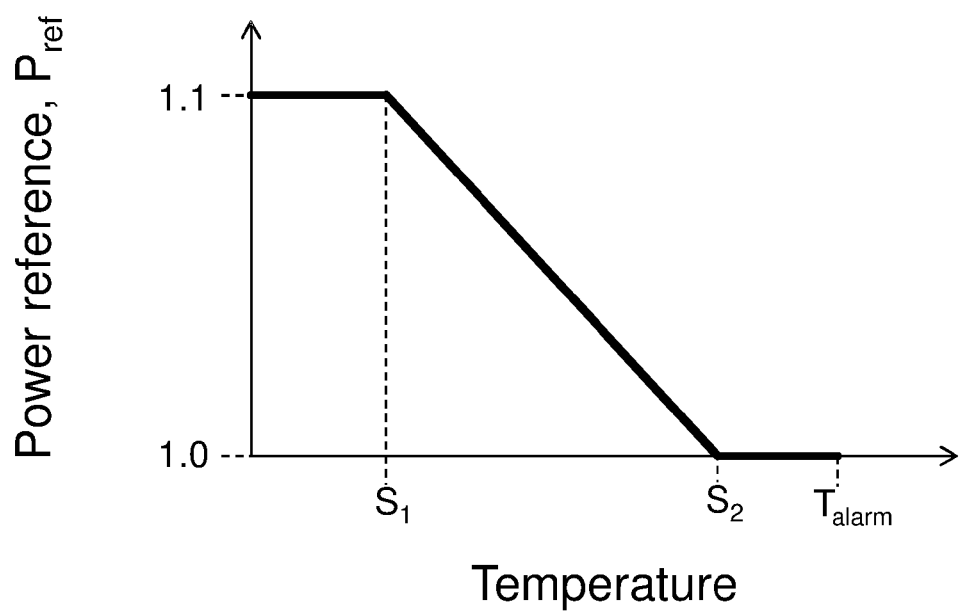
FIG. 3 is a graph illustrating proportional control of the amount of over-rating in response to an operating variable such as temperature, according to an embodiment of the invention.

An example embodiment of the invention will now be discussed with reference to FIG. 3. In FIG. 3, a graph illustrating an improved method of control of the over-rated power setting is shown. A lower limit temperature set point $S_1$ is defined in addition to the high temperature alarm limit $T_{alarm}$. Below temperature $S_1$ over-rating control is fully activated and the power reference is at its maximum value of 1.1. At temperatures in excess of temperature $S_1$, the controller reduces the power reference linearly from 1.1 to 1.0 as the temperature increases. At higher temperature limit, $S_2$, the amount of over-rating is set to be zero. As before, if the temperature exceeds $T_{alarm}$ then the temperature alarm limit is reached and the turbine may be shut down. In one example, the control is implemented by a single set point $S_1$ and a proportional gain $K_p$ which are used in closed-loop control to proportionally reduce the power reference over the predetermined range of temperatures ($S_1$ to $S_2$). In this example, the controller is only required to store a single new set point $S_1$ and the parameters to implement the closed loop control. In another example, both temperature limits $S_1$ and $S_2$ may be stored as set points.

In this example, the temperatures $S_1$ and $S_2$ are set to fall either side of the previous cut-off temperature $T_{cut-off}$ at values of say 73° C. and 78° C. The previous temperature set point $T_{cut-off}$ may also continue to be stored in memory.

Figure 2:
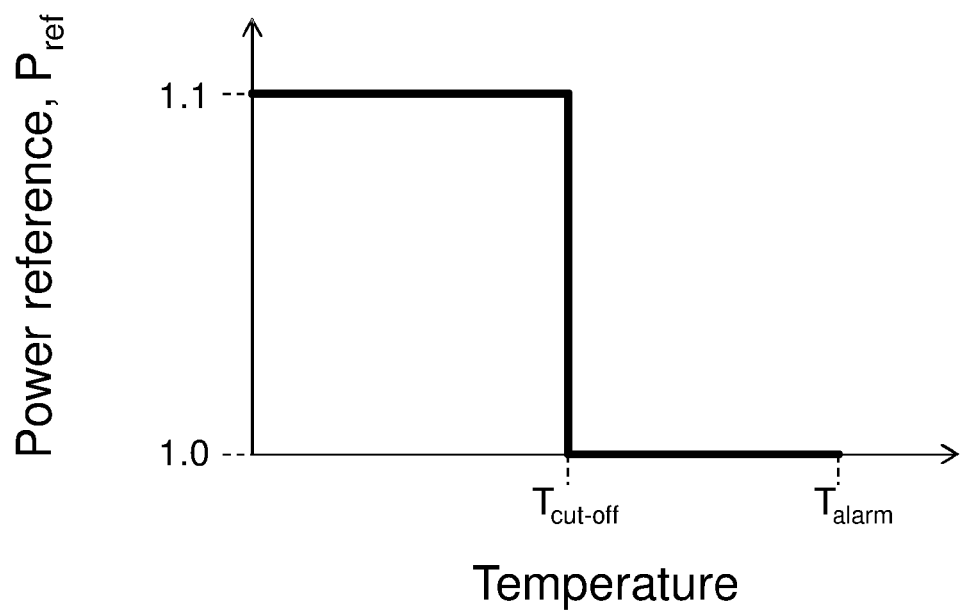
FIG. 2 is a graph illustrating cut-off control of the amount of over-rating in response to an operating variable such as temperature, according to a known control method.

The over-rating controller operation illustrated in FIG. 3 provides smoother control at marginal operating conditions than the prior art control of FIG. 2 and reduces the amount of switching between maximum and minimum over-rating settings. In addition, such a system allows the controller to push closer to the maximum power level at which the turbine can generate at a sustainable level. In other words, as illustrated in FIG. 3, the set point $S_2$ lies in the previous safety margin of FIG. 2, meaning that over-rating can take place over a larger range of temperatures, but at reduced levels to the previous case.

A wind turbine generator that operates for half the time at $P_{ref}=1.1$ and half the time at $P_{ref}=1.0$, controlled by the prior art over-rating control method of FIG. 2, would yield a mean power output of 105% rated power. In contrast to this, a generator controlled according to the over-rating control method of FIG. 3 may stabilise at an approximately constant value of $P_{ref}=1.07$, yielding a mean power output of 107% rated power. This scenario is particularly applicable if the effect of heating is non-linear, that is, the majority of the temperature increase during over-rating occurs near to the maximum over-rated power ($P_{ref}=1.1$). Such effects are compounded when many components are separately running close to their threshold temperatures.

Figure 4:
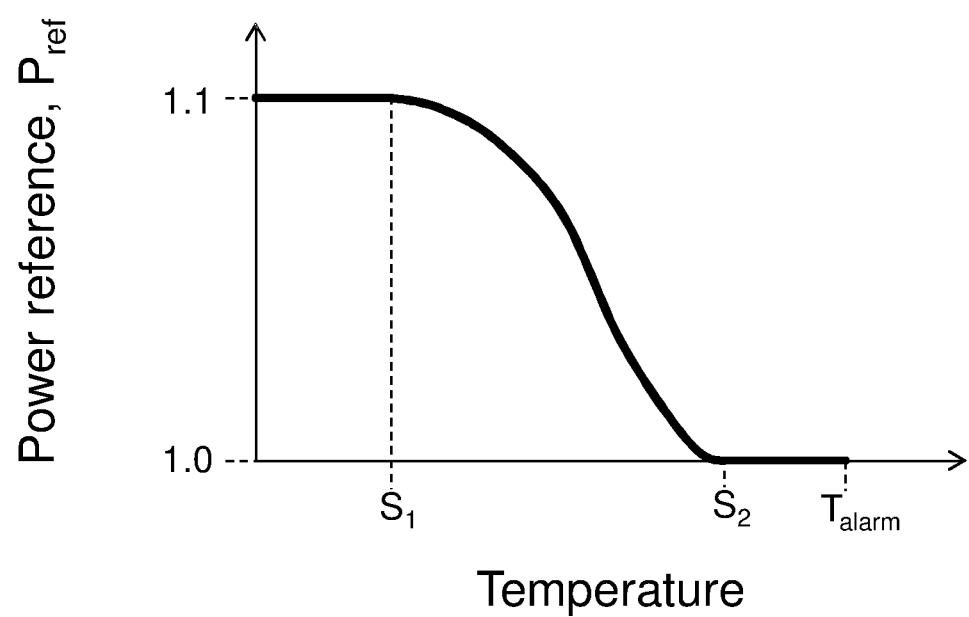
FIG. 4 is a graph illustrating non-linear control of the amount of over-rating in response to an operating variable such as temperature according to an embodiment of the invention.

In alternative embodiments, it may preferable to use a non-linear control relationship between the operational variable (for example, the temperature) and the power reference. An example of such a relationship is illustrated by the graph in FIG. 4. Furthermore, it may be preferable to use a proportional-integral (PI) controller, proportional-integral-derivative (PID) controller, or any other type of controller to adjust the over-rating set point in response to the value(s) of one or more operating variables.

In practice, the over-rating control is conducted based on a number of monitored or inferred operating variables, not just a single variable as in the example described above. The over-rating controller therefore necessarily receives a number of inputs from associated sensors to thereby monitor the generator, electrical and mechanical components of the wind turbine, and associated power electronics, and ensure that operation is safely controlled. Different operating variables may be treated in a number of different ways. As before, some parameters may correspond to alarm limits and over-rating limits, which trigger protection functions, such as cut-off functions completely deactivating the over-rating function, or shutting down the wind turbine. Other parameters, on the other hand, correspond to set points at which the over-rating is reduced from its maximum value to a lower value, such as zero. Of these operating variables and their associated parameters, it is helpful to discuss those override controls, or 'operational constraints', which rely on feedback, and those which do not. These will be described in more detail below. Furthermore, it will be appreciated that where there are a number of operating variables on the basis of which the over-rating power reference is controlled in parallel, the controller will require a technique for combining the different over-rating values indicated by the respective set points and control processes. In this example, and for simplicity, separate control processes are associated with the respective operating variables.

For example, consider an embodiment where the controller monitors two temperatures at different locations, such as the gearbox oil temperature of FIG. 3, and also the wind turbine main panel temperature. As before, if in FIG. 3, set points $S_1$ and $S_2$ correspond to temperatures 73° C. and 78° C., and the operating gearbox oil temperature is detected to be 75.5° C., the control process for the gearbox oil temperature will output a power reference of 1.05. At the same time, assume that the control function for the main panel temperature is the same shape, but the first set point $S_1$ is 68° C. and the second set point $S_2$ is 72° C. Then if the main panel temperature is detected as 71° C., the power reference output from the control process for the main panel temperature variable will be 1.025. In this example, the over-rating controller selects the minimum of the power references output by the control processes, so that the power reference is kept below the acceptable limits for all monitored or inferred variables. In alternative embodiments, the controller may operate differently by applying weighting values to the output power references before combining them using a suitable averaging function. Other control techniques may be possible.

Figure 5:
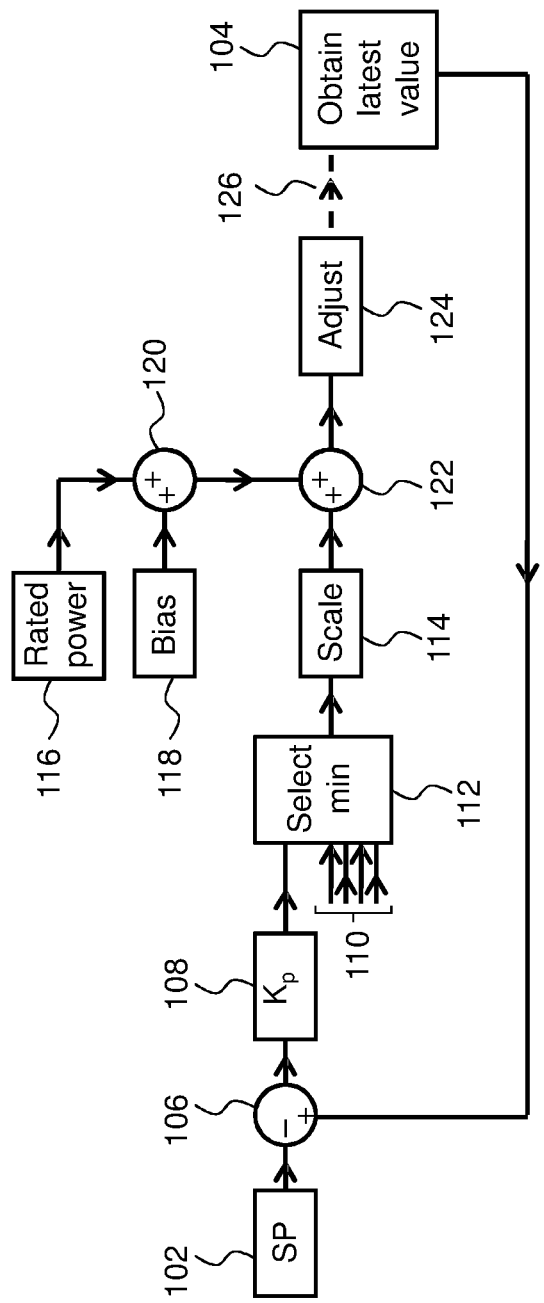
FIG. 5 is a flow diagram illustrating the proportional control process and selection of the lowest over-rating demand, according to an embodiment of the invention.

FIG. 5 shows a flow diagram depicting decision steps carried out by the over-rating controller. A set point 102 is initially input into the controller for a first operating variable against which the amount of over-rating is to be controlled. In step 104, the latest value of the operating variable is obtained. This may involve carrying out a direct measurement from a sensor for example, or obtaining the value in a different way, such as estimating the value, calculating the value, or inferring the value based upon, for example, other measured variables or the values of other operating variables. In addition, the value of an operating variable may be determined by a mathematical formula, looked up in a table, remain fixed, or be determined based upon data supplied to the wind turbine, for example data concerning present or future operating conditions. The variable's value may be passed into the control process by another piece of software or hardware. For example the grid voltage may be obtained by a power plant controller, in which case the step 104 would involve obtaining this value from said power plant controller rather than carrying out a measurement itself, although it may be preferable in other embodiments to measure the grid voltage value at each individual wind turbine.

The difference between the variable's set point (obtained in step 102) and its latest value (obtained in step 104) is used to calculate the error value in step 106. For the example of a temperature control variable, where typically it is desired to reduce the amount of over-rating if the temperature becomes too high, the error value E is calculated as $E=T_{latest}-T_{set-point}$ for $T_{latest}>T_{set-point}$. If $T_{latest}\leq T_{set-point}$ then the error value is zero. Here $T_{latest}$ is the latest measured value of the temperature, and $T_{set-point}$ is the temperature set-point.

For other control variables it is desirable to reduce the amount of over-rating if variable becomes too low rather than too high. An example of this is grid voltage, V. In this case, the error is zero if $V_{latest}\geq V_{set-point}$, but is given by $E=V_{set-point}-V_{latest}$ if $V_{latest}<V_{set-point}-V_{latest}$ is the latest measured value of the grid voltage, and $V_{set-point}$ is the grid voltage set-point, below which control of the over-rating is used increase the grid voltage back to its preferred value.

In both of the above situations, in which the over-rating should be reduced if the operating variables become either too high or too low, it is the extent to which the operating variable differs from the set point that is used in determining the error, and therefore the amount of over-rating.

In the case of proportional control, the error value is multiplied by a constant $K_p$ in step 108. This results in a value for the difference between the maximum over-rating and a reduced over-rating set point depending on the latest obtained value of the operating variable. If other forms of control are used then a different step 108 may be required. For example, in the case of non-linear control a look up table or mathematical formula may be used to obtain the updated over-rating set point for a given error value. If PI control is used then the step 108 will calculate an additional contribution to the updated over-rating set point by summing together previous error values, and PID control would further include a contribution depending on the rate of change of the error values. Other forms of control may also be used to determine the over-rating set point based upon the error value(s).

The calculated power over-rating set point for that control variable is then output to block 112. As noted above, the steps described thus far may be carried out for any number of operating variables, for example approximately 30 operating variables, the values of which will be used to obtain separate set points for the amount of over-rating. In this example, block 112 therefore receives a number of inputs corresponding to the appropriate over-rating set point for each of the monitored or inferred operating variables. In step 112, the minimum over-rating power reference is selected, and is converted into units of power relative to rated power in step 114.

The rated power of the wind turbine, represented in step 116, is optionally added to a bias power 118 in step 120. This bias power allows a certain amount of over-rating to occur even if the minimum over-rating set point output from step 112 is zero. The combined rated power of the wind turbine and bias power is subsequently added to the scaled over-rating demand in step 122 to obtain a final value, in units of power, to which the power of the wind turbine should be set. This power value is then fed to the appropriate wind turbine controller and the power output of the turbine adjusted accordingly (step 124).

For some operating variables, there will be a direct feedback between the measurement made by the corresponding sensor and the power demand setting output by the control process; as for example the temperature in the main panel, or the gearbox oil temperature. In other words, for these variables the adjustment made to the amount of over-rated power being generated will affect the variable(s) against which the over-rating is controlled, and a reduction in the amount of over-rating would for example be expected to lead to a corresponding reduction in temperature. For these variables, in FIG. 5, a complete control loop is therefore illustrated by the link 126, which depicts the relationship between changes in the amount of over-rating and changes in the control variable, and the automatic control is therefore that of a negative-feedback control. These variables can be called closed loop constraints for example.

Such operating variables may include the main bearing temperature, the gearbox front bearing temperature, the gearbox intermediate bearing front and rear temperatures, the gearbox rear bearing temperature, the generator stator windings' temperatures, the generator terminal box cable temperature, the main panel temperature, the converter temperature, and the transformer temperature, which should be maintained below the temperature rating requirements of the enclosed electrical equipment, including the contactors, breaker and busbars.

For other operating variables, there may be insignificant or no direct feedback between the measurement of the variable and the power demand, such as the grid voltage for example, but nevertheless, the power demand must be varied in proportion to or based upon the measurement. For these variables, which can be called open-loop constraints, there is therefore no feedback or control 'loop', and the control is similar to a ratio-control. As there is no control loop for these variables, the link 126 is notionally absent from FIG. 5 for this kind of variable. Such operating variables include grid voltage, grid frequency, or transformer voltage.

As 126 schematically shows the presence or absence of a feedback control loop for each operating variable, the link is indicated with a dashed line in FIG. 5.

It will be apparent to those skilled in the art that, in order to control efficiently the amount of over-rating, the parameters that are used to adjust the control process (for example, $K_p$) should be chosen such that the system converges upon a stable set point for the amount of over-rating within an appropriate time scale. The control process associated with each operating variable is likely to require different parameters (for example, different values of $K_p$) in order to achieve this, and these parameters will depend on the specifics of the system being used.

In an alternative scenario, the over-rated power may be converted into a corresponding maximum limit on generator load torque Q and/or generator speed ω, via the relation P=Qω. This would apply for turbines where over-rated operation is constrained using one or both of these variables instead of being constrained directly by the power. Generator current may be used to infer generator load torque, generator load torque may be used to infer rotor torque or the torque anywhere else in the drive-train, and generator speed may be used to infer rotor speed or the speed anywhere else in the drive-train. Therefore the over-rated power may also be converted into corresponding limits on one of rotor speed, generator speed or the speed at another location in the drive-train, together with one of generator current, generator torque, rotor torque or torque at another location in the drive-train.

Figure 6:
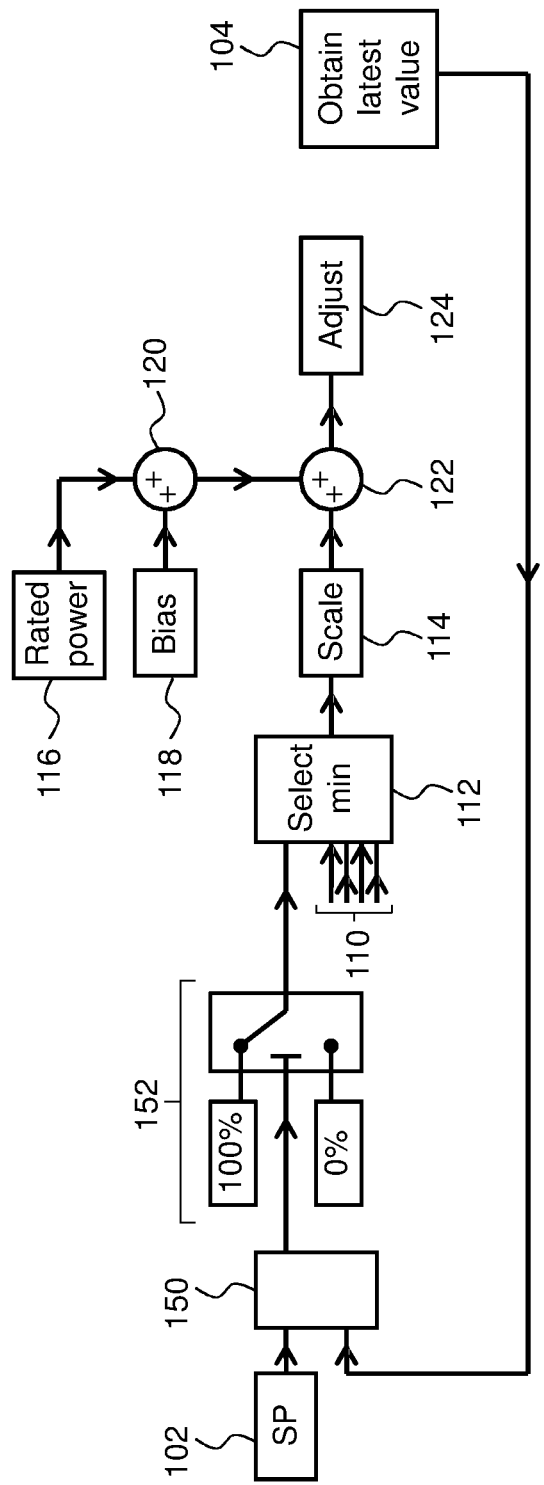
FIG. 6 is a flow diagram illustrating a control process whereby the turbine may be either fully over-rated or zero over-rated, and selection of the lowest over-rating demand, according to an embodiment of the invention.

For certain control variables, it may appropriate to provide only two possible outputs for the amount of over-rating: either zero over-rated or fully over-rated. For example, if it is detected that a particular sensor is faulty then it may be preferable to cancel over-rating immediately. A flow chart for this type of control, "open-loop cancellation constraints", is depicted in FIG. 6.

Continuing with the example of a sensor fault, the set point is equal to "no-fault" (102) and the latest value of the sensor's status, which is either "fault" or "no-fault", is obtained (104). These two values are fed into a relational operator 150 whose output is fed into a switch 152. Thus if the set point is equal to "no-fault" and the latest value is also equal to "no-fault", the relational operator 150 outputs "high" and the switch 152 remains at 100% over-rating. Alternatively, if the latest value of the sensor's status is "fault" then the relational operator 150 compares this to the set point and outputs "low", changing the state of the switch 152 to 0% over-rating.

Once it is output, the over-rating set point is then passed onto the next step 112 which compares it with the over-rating set points output from the other control variables 110 and selects the minimum. The remainder of the process continues in the same way as described above.

Other control variables which are monitored and implemented on the basis of associated open-loop cancellation constraints include temperature alarm triggers such as the gearbox oil temperature 1-second alarm, the gear-oil temperature 10-minute temperature alarm, the gear-oil temperature 1-hour temperature alarm, the Top Panel (Top Box) temperature alarm, the Uninterruptable Power Supply (UPS) Panel temperature alarm, the Control Panel temperature alarm, as well as the tower-cable twist value and cable twist count. Optionally, additional constraints may include the ambient air temperature becoming excessively high, or any of the three phase power factor signals becoming excessively low. Further constraints for cancelling the over-rating may be based on detection of environmental conditions such as air temperature, wind speed, turbulence, the arrival of imminent wind gusts, and so on.

As before, the controller additionally maintains a number of alarm limits. Alarm limits may include the gearbox oil temperature 1-second alarm, the gear-oil temperature 10-minute temperature alarm, the generator terminal box cable temperature becoming excessively high, the generator terminal box air temperature becoming excessively high, the generator terminal box air-temperature sensor becoming faulty, and so on.

Figure 7:
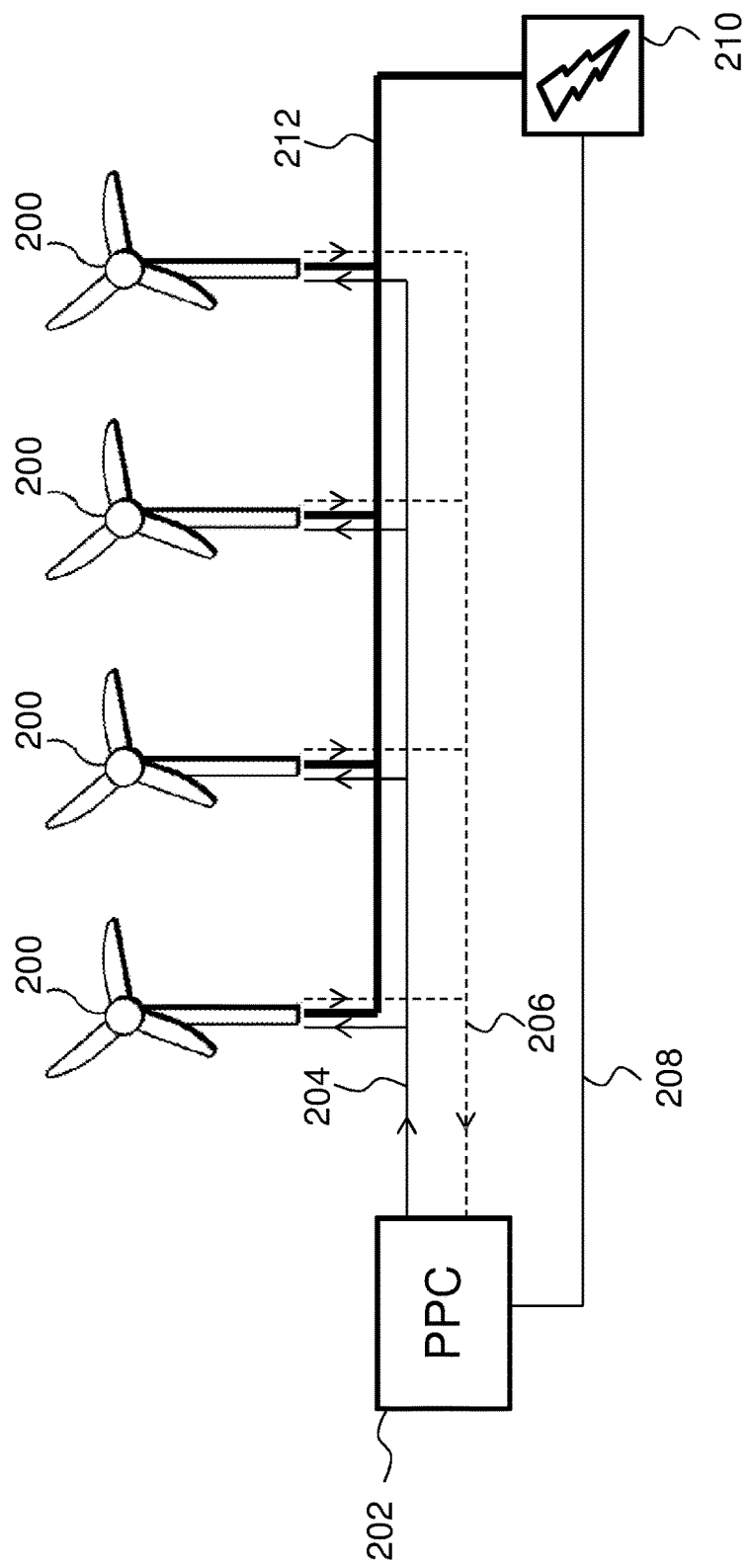
FIG. 7 is a schematic view of a wind power plant using a power plant controller.

FIG. 7 shows how the control process of the present invention may be incorporated into a wind power plant which includes a plurality of wind turbines 200, each of which may be connected to a power plant controller 202. Control and sensing links 204 and 206 connect the power plant controller to and from the wind turbines. The power plant controller is also coupled via links 208 to the grid 210 such that it may obtain, for example, the latest value of the grid voltage and the values of other control variables. These links may be any suitable wired and/or wireless communication links. Each wind turbine is also connected via cables 212 to the grid 210 to allow the generated power to be delivered.

The power plant controller can communicate the value of the grid voltage or other operating variables to an individual wind turbine control system via the connection 204, for use (possibly in combination with one or more further operating variables) in calculating a maximum over-rated power according to the control process described above. This maximum over-rated power can be communicated back to the power plant controller 202, which can then use this information in deciding appropriate power demands for the other wind turbines. These set points can then be communicated to the appropriate turbines from the power plant controller, and the turbines made to adjust their power output accordingly. This process may be repeated to adjust dynamically the power demands made of each individual turbine in response to changes in the maximum over-rated powers. Other factors which may include, for example, the total power demanded of the power plant as a whole or the number of wind turbines which are currently shut down may also affect the power demands made of each individual turbine by the power plant controller.

It will be appreciated that the control of the maximum over-rating power need not necessarily occur within the separate wind turbine controllers and may instead occur within the power plant controller or in some other location.

A control strategy for over-rating wind turbine generators has therefore been described. The control strategy reduces over-rating to zero using feedback control before alarm levels for power-sensitive conditions (such as bearing temperatures) are breached, to ensure that over-rating is not itself the cause of an increase in alarms and shutdowns. Further, control functions are provided to optionally allow over-rating to be cancelled or reduced on each turbine to cater for local conditions that may affect the ability of the balance of plant to carry the additional power, and control settings ensure that at all times the current-carrying capabilities of the electrical equipment: cables, junctions and terminations, the main panel, busbars, breakers, contactors, mechanical components, power electronics, and transformers, are not exceeded. Over-rating may be cancelled in extreme weather conditions, to avoid the potential for an excessive accumulation of fatigue damage.

As will be appreciated by the skilled person, the controller and the various control functions are suitably implemented in hardware and/or software as appropriate. Further, the controller 15 may be located within the nacelle, tower base, or may be located at some other position. A single controller may also be used for more than one wind turbine.

The embodiments described above are for example purposes only, and it will be appreciated that features of different embodiments may be combined with one another.

What is claimed is:

1. A control method for controlling a wind turbine generator to generate power above a rated value, the control method comprising:
   determining a difference between a value of a first operating variable and a first set point;
   determining, based at least on the difference, an over-rated setting indicating an extent to which an operating characteristic of the wind turbine generator is to be over-rated between a maximum over-rated setting value and a minimum over-rated setting value, wherein the maximum over-rated setting value is equal to an over-rated setting of the wind turbine generator when the first operating variable is equal to the first set point;
   outputting a first over-rating command value based on the difference;
   controlling an over-rating setting of the wind turbine generator based on the first over-rating command value, wherein controlling the over-rating setting controls a power output of the wind turbine generator; and
   incrementally reducing the over-rating setting to the minimum over-rated setting value based on the difference between the first operating variable and the first set point,
   wherein as the value of the first operating variable tends towards an alarm set point for the first operating variable, the minimum over-rated setting value is reached before the alarm set point is reached.

2. The control method of claim 1, wherein the operating characteristic is one or more of the power generated by the wind turbine generator, the rotational speed of the wind turbine generator, the load torque of the wind turbine generator, and load current of the wind turbine generator.

3. The control method of claim 1, wherein when the first operating variable is determined to be equal to the alarm set point, an alarm signal is issued resulting in one or more of: the wind turbine generator being shut-down, de-rating of the power below rated power, pitching of wind turbine blades into a feathered position, application of mechanical or electrical braking, disconnection of a main circuit breaker, sending a warning message to a supervisory control and data acquisition system, logging operating conditions at the time of the alarm.

4. The method of claim 1, wherein the operating characteristic is one or more of the power generated by the wind turbine generator, the rotational speed of the wind turbine generator, the load torque of the wind turbine generator, and load current of the wind turbine generator.

5. The control method of claim 1, further comprising:
   receiving a second set point for a second operating variable, the second set point indicating a transition point between a first operational region where over-rating is permitted and a second operational region where over-rating is to be cancelled;
   determining whether the second operating variable falls within the second operational region; and
   cancelling over-rating of the wind turbine generator based on the determination.

6. The control method of claim 5, further comprising:
   querying one or more sensors to determine values for one or more of the first operating variable and the second operating variable, and
   determining whether one or more of the first set point or the second set point are exceeded based on the determined values.

7. The control method of claim 5, further comprising:
   inferring a value for at least one of the first or the second operating variables by one or more of: estimating the value, calculating the value, looking up the value in a table, assigning a fixed number to the operating variable, using a mathematical formula to determine the value, determining the value on the basis of data supplied to the wind turbine, and obtaining the value from hardware or software separate to the wind turbine.

8. The method of claim 1, where the over-rated setting is determined using one or more of proportional control, proportional-integral control, and proportional-integral-derivative control.

9. A method for controlling a wind turbine generator to generate power above a rated value, the method comprising:
   determining a first difference between a value of a first operating variable and a first set point;
   determining a second difference between a value of a second operating variable and a second set point;
   determining, based at least on the first difference and the second difference, an over-rated setting indicating an extent to which an operating characteristic of the wind turbine generator is to be over-rated between a maximum over-rated setting value and a minimum over-rated setting value, wherein the maximum over-rated setting value is equal to an over-rated setting of the wind turbine generator when the first operating variable is equal to the first set point; and
   controlling an over-rating setting of the wind turbine generator based on a minimum value selected from a first over-rated command value based on the first difference, and a second over-rated command value based on the second difference, wherein controlling the over-rating setting controls a power output of the wind turbine generator.

10. The control method of claim 9, further comprising:
    receiving a third set point for a third operating variable, the third set point indicating a transition point between a first operational region where over-rating is permitted and a second operational region where over-rating is to be cancelled;
    determining whether the third operating variable falls within the second operational region; and
    cancelling over-rating of the wind turbine generator based on the determination.

11. The control method of claim 10, further comprising querying one or more sensors to determine values for the first, second or third operating variables, and determining whether the first, second or third set points are exceeded based on the determined values.

12. The control method of claim 10, further comprising: inferring values for at least one of the first, second, or third operating variables by one or more of: estimating the value, calculating the value, looking up the value in a table, assigning a fixed number to the at least one of the first, second, or third operating variables, using a mathematical formula to determine the value, determining the value on the basis of data supplied to the wind turbine, and obtaining the value from hardware or software separate to the wind turbine.

13. The control method of claim 9, where the extent of the over-rating is determined using one or more of proportional control, proportional-integral control, proportional-integral-derivative control.

14. A wind turbine controller, comprising:
a processor programmed to perform an operation for controlling a wind turbine generator to generate power above a rated value, the operation comprising:
determining a difference between a value of a first operating variable and a first set point;
determining, based at least on the difference, an over-rated setting indicating an extent to which an operating characteristic of the wind turbine generator is to be over-rated between a maximum over-rated setting value and a minimum over-rated setting value, wherein the maximum over-rated setting value is equal to an over-rated setting of the wind turbine generator when the first operating variable is equal to the first set point;
outputting a first over-rating command value based on the difference;
controlling the over-rating setting of the wind turbine generator based on the first over-rating command value, wherein controlling the over-rating setting controls a power output of the wind turbine generator; and
incrementally reducing the over-rating setting to the minimum over-rated setting value based on the difference between the first operating variable and the first set point,
wherein as the value of the first operating variable tends towards an alarm set point for the first operating variable, the minimum over-rated setting value is reached before the alarm set point is reached.

15. A non-transitory computer-readable medium executable on one or more wind turbine controllers to perform an operation for controlling a wind turbine generator to generate power above a rated value, the operation comprising:
determining a difference between a value of a first operating variable and a first set point;
determining, based at least on the difference, an over-rated setting indicating an extent to which an operating characteristic of the wind turbine generator is to be over-rated between a maximum over-rated setting value and a minimum over-rated setting value, wherein the maximum over-rated setting value is equal to an over-rated setting of the wind turbine generator when the first operating variable is equal to the first set point;
outputting a first over-rating command value based on the difference;
controlling the over-rating setting of the wind turbine generator based on the first over-rating command value, wherein controlling the over-rating setting controls a power output of the wind turbine generator;
incrementally reducing the over-rating setting to the minimum over-rated setting based on the difference between the first operating variable and the first set point,
wherein as the value of the first operating variable tends towards an alarm set point for the first operating variable, the minimum over-rated setting value is reached before the alarm set point is reached.

* * * * *